(12) United States Patent
Waris

(10) Patent No.: US 8,151,321 B2
(45) Date of Patent: Apr. 3, 2012

(54) MODULAR NETWORK-ASSISTED POLICY RESOLUTION

(75) Inventor: Heikki Waris, Helsinki (FI)

(73) Assignee: Nokia Corporation, Espoo (FI)

( * ) Notice: Subject to any disclaimer, the term of this patent is extended or adjusted under 35 U.S.C. 154(b) by 1768 days.

(21) Appl. No.: 11/333,928

(22) Filed: Jan. 17, 2006

(65) Prior Publication Data

US 2007/0089161 A1  Apr. 19, 2007

(30) Foreign Application Priority Data

Oct. 13, 2005  (EP) .................................... 05022370

(51) Int. Cl.
*H04L 29/06* (2006.01)
(52) U.S. Cl. ............................................. 726/4; 726/11
(58) Field of Classification Search ................... 726/1, 3
See application file for complete search history.

(56) References Cited

U.S. PATENT DOCUMENTS

| | | | | |
|---|---|---|---|---|
| 6,678,835 | B1 * | 1/2004 | Shah et al. ..................... | 709/223 |
| 7,440,430 | B1 * | 10/2008 | Jagadeesan et al. .......... | 370/331 |
| 2002/0069200 | A1 * | 6/2002 | Cooper et al. .................... | 707/9 |
| 2004/0203732 | A1 * | 10/2004 | Brusilovsky et al. ...... | 455/426.1 |
| 2007/0117564 | A1 | 5/2007 | Reynolds | |

FOREIGN PATENT DOCUMENTS

WO  WO2007042903 A1  4/2007

OTHER PUBLICATIONS

Office Action for Japanese Patent Application No. 2008-534105, dated Mar. 14, 2011.
English translation of Office Action for Japanese Patent Application No. 2008-534105, dated Mar. 14, 2011.
European Office Action for European Application No. 06 808 978.8, dated Mar. 31, 2011.

\* cited by examiner

*Primary Examiner* — Gilberto Barron, Jr.
*Assistant Examiner* — Simon Kanaan
(74) *Attorney, Agent, or Firm* — Harrington & Smith

(57) ABSTRACT

The present invention relates to a policy resolution method and system, access network and terminal device for enabling modular network-assisted policy resolution, wherein the policy resolution is divided into separate stages each handling specific types of trigger events and performing specific types of policy actions. The separate stages are processed in a chronological order during a policy resolution round, and trigger events which occur during a policy resolution round are frozen until the start of the next policy resolution round. Thereby, modular policy resolution with reduced delays and oscillations can be achieved. Moreover, policy processing can be divided into a policy decision point functions in the network and a policy enforcement point function in the network or terminal device, so that terminal resources used for policy resolution can be saved.

24 Claims, 6 Drawing Sheets

MODULAR NETWORK-ASSISTED POLICY RESOLUTION

CROSS-REFERENCE TO RELATED PATENT APPLICATIONS

The present application claims priority to European Patent Application No. 05 022 370.0, filed Oct. 13, 2005 and incorporated herein by reference in its entirety.

FIELD OF THE INVENTION

The present invention relates to a method, system, network element and terminal device for policy resolution with interdependent trigger events and policy actions. In particular, the present invention relates to multi-access policy resolution.

BACKGROUND OF THE INVENTION

In order to make dynamic systems behave as required, the users and operators of such systems can use a set of policies that specify how the system should respond to various situations. Each policy or policy statement applies to a specific application or a set of applications, and may be specific to a logical instance of the application. It may describe a condition and a network service to be applied for traffic matching that condition. A policy statement may comprise a general Boolean expression of its underlying policy conditions. Each condition describes a subset of traffic flows of the application and may comprise basic condition components, each comprising a basic policy parameter identifier, an operator and operand. Policy identifiers may be application-specific. Each policy identifier may have a pre-defined type such as string, integer, or enumerated value. For example, a policy identifier may be "URL", an operator may be "contains", and an operand may be "www.nokia.com". A plurality of global, pre-defined policy identifiers may include source and destination Internet Protocol (IP) address, source and destination port numbers, protocol, application identifier, and an application code point (ACP) which may identify and define one or more types of traffic flows or classes that are produced by an application or may define application flows in a static manner, for example, according to intrinsic application parameters.

The overall mechanism then consists of the configuration and management of the policies (human interface of the policy control mechanism), and the resolution and enforcement of the policies (automated part of the mechanism). The policy resolution and enforcement applies the configured policies by first receiving as input a trigger event that initiates the resolution of a policy, and then sending as output instructions that enforce the outcome of the resolved policy action.

The trigger events and policy actions can generally be described as state changes. Trigger events are already happened state changes that are received as inputs, while policy actions are state changes that should happen in the future, and are for that purpose sent as outputs. The actual detection of trigger events and effecting of changes specified by the policy actions can be considered to reside in components outside of the policy control mechanism.

Because both trigger events and policy actions are state changes with only difference being their timing and probability (1 for trigger events, <1 for policy actions), the conclusion is that some policy actions can become trigger events for subsequent policies. There is a unidirectional causal relationship between the two, where one state change can be traced backwards or forwards to another state change. This makes policy I/O different from generic I/O in e.g. software.

One example of policy control area is multi-access, which means a situation where a device has multiple interfaces, logical accesses and connected network domains over which it has connections and traffic flows. The device can have access over these multiple networks sequentially or simultaneously, and policies are needed to describe which connection is acceptable over which network, as well as whether it can or should be moved to a new network.

An example of the policy resolution is when a trigger event such as a detection of an interface losing connectivity to a network causes the policy action of attempting detection of a new network with a different interface, joining the new network and then moving all traffic to it from the previous network. The policies involved in this task easily become very complicated, and multiple trigger events can be received during very short periods of time. The policy actions may also become available for sending as outputs at different times, because resolution of some of them consists of more steps and takes more time than for the others. This may lead to resolution delays, e.g. when the resolution engine first receives a trigger event telling it that a new flow has been initiated and selects a suitable network for it; and immediately afterwards receives a trigger event telling that the network has become unavailable, meaning that the resolution engine needs to select a new network. Additionally, looping and oscillation in terminal connectivity may occur, e.g. when the resolution engine first receives a trigger event telling it that a flow has been closed and disconnects from that access network because there are no more flows using it, and immediately afterwards receives a trigger event telling that a new flow has been initiated and needs to join the same network again.

Current policy control mechanisms typically use an explicit set of tests (conditions to triggers) to decide on a policy and get an enforceable result. Thus, adding more triggers leads to very deep parallel sets of conditionals, and excessively large policy descriptions. Additionally, some of the triggers are dependent on other triggers. E.g., a network cannot be detected on network layer (L3) until the proper interface has been activated on physical layer and detected a link on link layer (L2). Waiting for such dependencies between triggers to be resolved would prevent the terminal from making some other policy decisions in the meantime because of the linear execution of the policy conditionals.

Also, if a linearly executed policy uses only some part of all possible triggers, it is possible that the result causes another trigger event, whose separate linearly executed policy then results in triggers to the first policy. Such looping could be e.g. activation of an interface triggered by a new traffic flow, where that activation could in a second policy result in blocking the use of another interface required for maintaining the traffic flow, which would then nullify reverse the outcome of the first policy.

There is an ongoing effort to define the architecture for 3.9G ($3.9^{th}$ generation) systems. The current view is that there will be a home domain for the users, and their policy information can be transferred to other network domains for proxy policy decision making and enforcement. There will be an Access Aggregation domain through which both the control plane and the user plane of the end user's traffic flows. The domain offers intelligent management of end user access from multiple local Access Connectivity domains, which can be e.g. WLAN (Wireless Local Area Network) or WiMAX (Worldwide Interoperability for Microwave Access) access networks. This facilitates both network based multi-access proxy policy decision and enforcement.

The mobile terminal device should autonomously make decisions about which access networks or access points each data flow should be associated with. However, the terminal may not be able to operate in an optimized way due to insufficient information on local access networks, such as lack of definitions for some access points or inability to detect nearby but yet just out of coverage radio networks.

SUMMARY OF THE INVENTION

It is therefore an object of the present invention to provide an improved policy resolution scheme by means of which resolution delays, looping and oscillation as well as consumption of terminal resources can be reduced.

This object is achieved by a method of policy resolution with interdependent trigger events and policy actions, said method comprising the steps of:
 dividing said policy resolution into separate stages each handling specific types of said trigger events and performing specific types of said policy actions;
 processing said separate stages in a chronological order during a policy resolution round; and
 freezing trigger events which occur during a policy resolution round until the start of the next policy resolution round.

Furthermore, the above object is achieved by a policy resolution system for performing policy resolution with interdependent trigger events and policy actions, said system comprising:
 processing means for processing separate stages of said policy resolution in a chronological order during a policy resolution round, each of said stages handling specific types of said trigger events and performing specific types of said policy actions; and
 freezing means for freezing trigger events which occur during a policy resolution round until the start of the next policy resolution round.

Accordingly, policy resolution is divided into clearly separate stages that handle specific types of trigger events and perform specific types of policy actions. Each policy resolution round goes through the stages in a chronological order. The set of trigger events is frozen before each round so that if there are trigger events that started after the round started, they will be postponed to the next resolution round. This avoids complex (nested) policy rules and reduces resolution delays, looping and oscillation in terminal connectivity when there are conflicting policies or events. Jitter or looping of resolution results or processes thus can be avoided. Certain types of triggers can be processed as an aggregate without dependence (except by scheduling based on the type of the aggregate) on other triggers. All factors affecting a certain trigger type are processed at the same time, and this allows for avoidance of unexpected consequences.

The resolution round may comprise a first stage of network availability detection, a second stage of listing of accessible networks, a third stage of updating of associations between traffic flows and their parent domains and selection and joining of preferred networks for domains, a fourth stage of updating of associations between flows and access networks and deciding on handovers, a fifth stage of disconnection from networks or deactivation of interfaces, and a sixth stage of execution of policy resolution.

The trigger events comprise configuration events and connectivity events. The configuration events may be sent by a configuration application in one set. Additionally, configuration events may be buffered over time periods longer than those of other trigger events.

The above first stage may be performed based on knowledge about the need for it or estimation about when it could result in new information. In particular, the first stage may be performed based on context information indicating at least one of a timer event and a location detection, configuration information indicating at least one of a user interface access event and a user interface configuration event, and network state information indicating at least one of a flow initiation and a flow termination.

The above second stage may be started from a list of networks that were detected as available, and then those networks which are blocked by current policies may be removed from the list. In particular, the second stage may be performed based on configuration information indicating at least one of a change of profile preference and an access point change, and network state information indicating at least one of an available access point and a unavailable access point.

The above third stage may be performed by checking flows of a first domain with respect to their need to move to a second domain. Particularly, the third stage may be performed based on configuration information indicating at least one of a change of domain preference and an change of domain definition, and network state information indicating at least one of a flow initiation and a flow termination.

The above fourth stage may be performed based on network state information indicating at least one of an unavailable access point and an initiated flow.

Additionally, disconnection and deactivation in the fifth stage may be performed for any access network that no longer has any active flows. Specifically, the fifth stage may be performed based on network state information indicating at least one of a flow initiation and a flow termination.

The processing of each of said first, third and fourth stages and at least a partial processing of said second stage is performed at an access gateway device (50). As an alternative, the processing of said first stage may be performed at a terminal device of the respective user, which may also perform the processing of the fifth stage. At least a partial processing of the second stage may be performed at a service gateway device.

Additionally, the above object is achieved by an access network for performing policy resolution with interdependent trigger events and policy actions, said access network comprising:
 maintaining means for maintaining preference information of users;
 identifying means for identifying user flows;
 policy resolution means for executing a proxy policy resolution process using said preference information.

Further, the above object is achieved by a terminal device for enforcing a multi-access policy with interdependent trigger events and policy actions, said terminal device comprising:
 initiation means for initiating a traffic flow towards an access network;
 resolution enforcement means for performing a partial policy enforcement in response to an enforcement signal received from said access network.

Accordingly, components of a modular multi-access policy resolution framework are distributed among the terminal device and its associated access network(s). The access network maintains a relevant portion of the user's up-to-date preference information. The access network then identifies each user's flows and is able to execute a proxy policy resolution process in order to select an appropriate access point for the flow, using the user's preference information.

The access network may be configured to enforce policies transparently. Alternatively, the access network may be configured to have policies at least partially enforced at a respective terminal device by initiating an enforcement signaling with the terminal device.

Furthermore, the access network may be configured to create access definitions for matching against the preference information.

The identifying means may be configured to identify an end user based on its Internet Protocol address. Additionally, the identifying means may be configured to identify a remote end point based on a Uniform Resource Identifier (URI) detected by a Session Initiation Protocol (SIP) proxy, a Domain Name Server (DNS) name detected by a DNS server, or at least one of an Internet Protocol (IP) address and port detected by a border router or a mobility gateway.

The terminal device may be adapted to establish a secure connection to a network entity maintaining multi-access policies and to configure the multi-access policy.

Additionally, the terminal device may be configured to transfer a subset of an end user's policy configuration to a visited access network.

Further advantageous modifications may be defined in the dependent claims.

BRIEF DESCRIPTION OF THE DRAWINGS

In the following, the present invention will be described in greater detail based on embodiments with reference to the accompanying drawings in which.

DETAILED DESCRIPTION OF THE PREFERRED EMBODIMENTS

The preferred embodiment will now be described on the basis of a multi-access network environment for a wireless terminal device or user equipment (UE).

Figure 1:
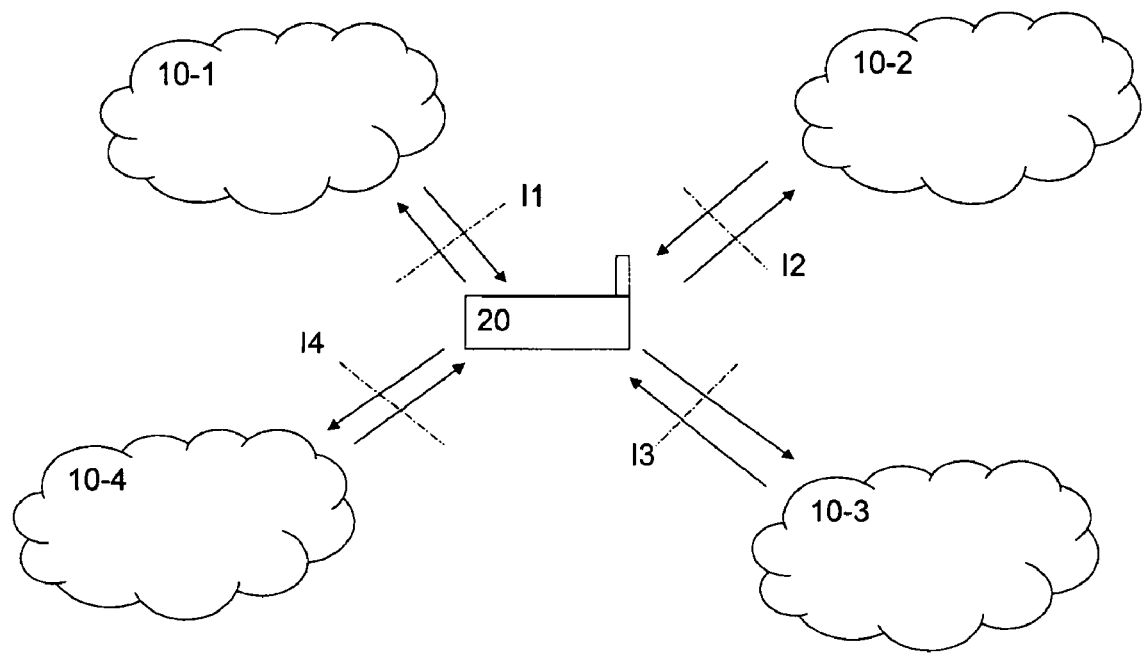
FIG. 1 shows a schematic diagram indicating an example of a multi-access environment where the present invention can be implemented.

FIG. 1 shows a schematic diagram of such a multi-access network environment, wherein a converged terminal device, i.e. UE 20, with multi-access capability can be connected to different networks or network domains 10-1 to 10-4 and/or services by using different mechanisms via respective interfaces I1 to I4. A multi-access network is a network that supports accessing network services through different mechanisms. For example, a typical corporate intranet can be accessed via Ethernet inside buildings or over GPRS (General Packet Radio Services), EDGE (Enhanced Date rates for GSM Enhancement), WCDMA (Wideband Code Division Multiple Access), Cable, xDSL (Digital Subscriber Line), WLAN etc.

Figure 2:
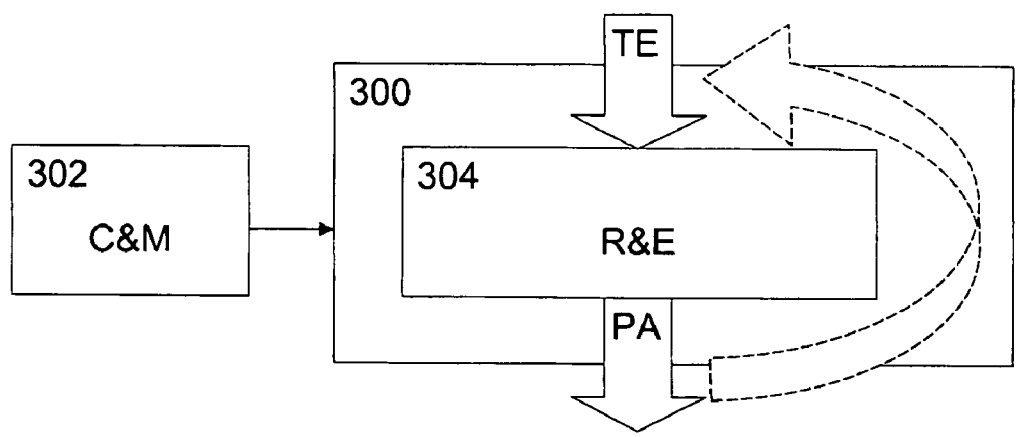
FIG. 2 shows a schematic block diagram of a policy resolution engine.

FIG. 2 shows a schematic block diagram of a policy resolution mechanism or engine which can be used for policy resolution in the multi-access network environment of FIG. 1. The overall policy resolution mechanism consists of a first mechanism 302 responsible for configuration and management (C&M) of the policies and which forms a human interface of a policy control mechanism 300, and a second mechanism 304 responsible for resolution and enforcement (R&E) of the policies The second mechanism 304 forms a part of the policy control mechanism 300 and is an automated part of the whole policy resolution mechanism. The policy resolution and enforcement performed by the second mechanism 304 is configured to apply configured policies by first receiving as input a trigger event TE that initiates the resolution of a policy, and then sending as output instructions that enforce the outcome of the resolved policy action PA. The dotted arrow in FIG. 2 indicates the initially described conclusion that some policy actions PA can become trigger events TE for subsequent policies.

According to the first embodiment, multi-access policy resolution is divided into clearly separate stages that handle specific types of trigger events and perform specific types of policy actions, while each policy resolution round goes through the stages in a chronological order.

Figure 3:
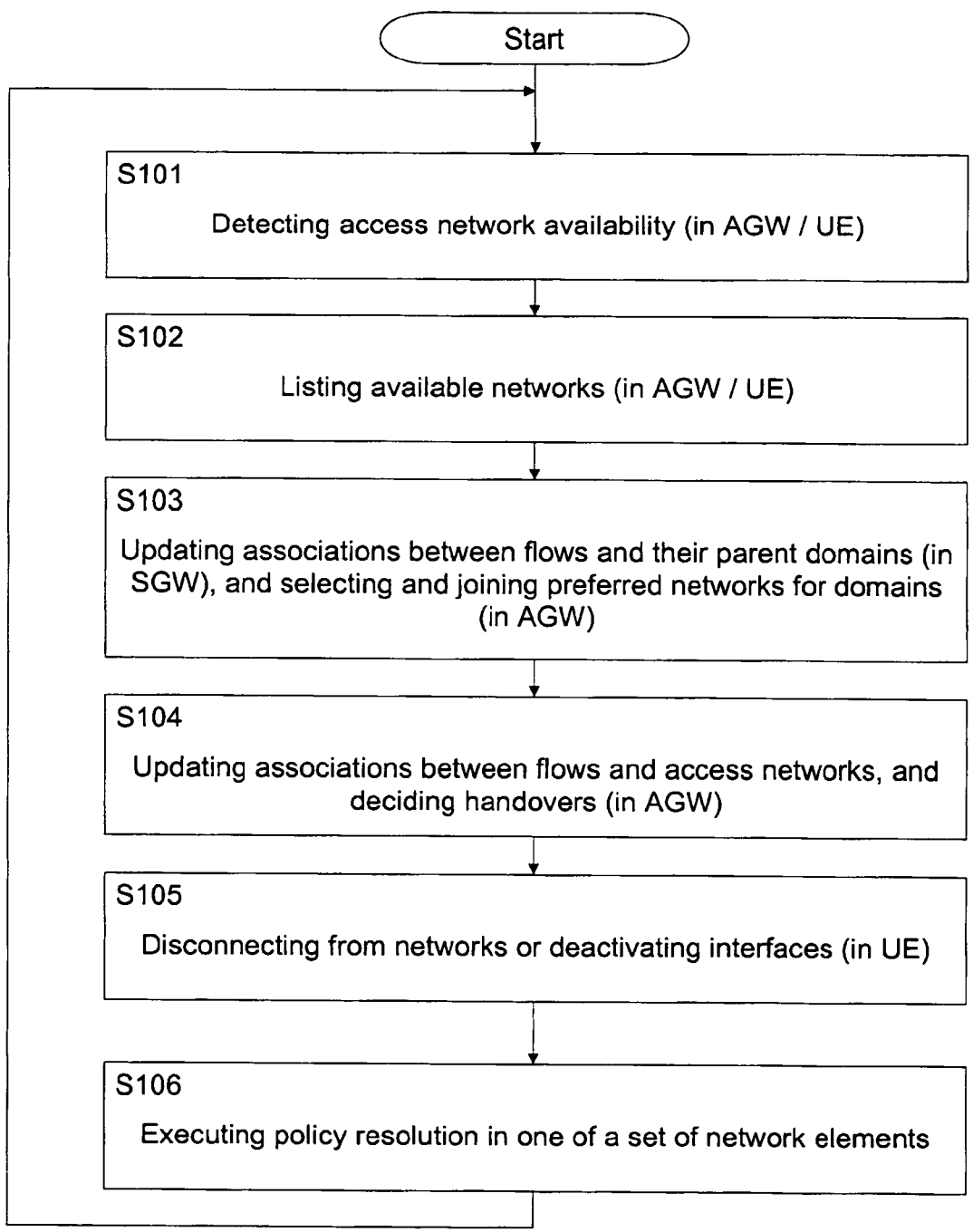
FIG. 3 shows a flow diagram of a modular policy resolution procedure according to a first embodiment.

FIG. 3 shows a flow diagram of the stages of a resolution round according to the first embodiments. The set of trigger events is frozen before each round so that if there are trigger events that started after the round started, they will be postponed to the next resolution round. The policy resolution engine, as shown in FIG. 2, receives trigger events TE, including both configuration and connectivity events, from external components and classifies them based on their types. These events are received over a certain short period of time that is long enough for clearly interrelated events to take place.

According to FIG. 3, the resolution rounds consist of a first step or stage S101

In which access network availability is detected by initiating LAP (Internet Access Point) availability detection based on knowledge about the need for it (e.g. timer or location), or estimation (best guess) about when it could result in new information. It may be assumed that a user might know about new availability and expresses it directly through configuration, or indirectly by starting flows.

Then, in the second step or stage S102, available networks are listed by constructing a list of usable access networks starting from a list of those that were detected as available, and then removing from this the ones that are blocked by current policies, either because they are explicitly denied by some policy component, or because they are simply not good enough when comparing all user preferences against the network capabilities.

In the subsequent third step or stage S103, association of flows to domains (domain means a network, or a certain traffic or service type) are updated, e.g. if user moves an IP address range classifier element from one domain to another, then the engine should check all flows in the first domain if there is need to move them to the second domain. Additionally, a preferred access network is selected for each domain and inactive but available access networks are joined if necessary (including activation of interfaces). The reason why this is done for the whole domain is to reduce policy engine processing requirements—if there is enough power available, each flow can later select its own instead of this domain-specific default.

Then, in the fourth step or stage S104, associations between flows and access networks (i.e. access network selection) are updated for each flow and it is decided whether those individual flows can and should perform handovers. If they don't support IP mobility and cannot be kept in the current network, they need to be closed.

In the subsequent fifth step or stage S105, any access networks that no longer have any active flows should be disconnected and the interfaces deactivated.

Finally, in the last sixth step or stage S106 of the resolution round, a policy resolution algorithm component is executed in one of a set of network elements (NE), such as terminal device (UE), Access Gateway (AGW), Service Gateway (SGW) or Subscriber Profile Repository (SPR). The SGW is used in case of service driven end-to-end session establishment. In simpler (single operator) deployments, the AGW performs the functions attributed to the SGW.

Specifically, the following default distribution of the functions may be implemented.

Access network availability detection and listing in the first stage S101 may be performed in the AGW or alternatively in the UE. Profile contents update in the second stage S102 may be created in the UE, stored in the SPR, and resolved in the AGW and/or in the SGW. In particular, selection and joining of preferred networks can be controlled by the AGW, while selection of preferred networks for defined domains can be controlled by the SGW. Furthermore, updating of associations between traffic flows and their parent domains in the third stage S103 can be controlled by the SGW, while flow termination and initiation in the fourth stage S104 can be controlled by the AGW. Updating associations between flows and access networks and deciding handovers can be done or controlled by the AGW, while closing of unused interfaces can be effected in the UE.

There should be an interface and protocol for exchanging trigger events (i.e. function calls or inter-process messages of the terminal internal algorithm) between NEs and between UE and NEs.

Figure 4:
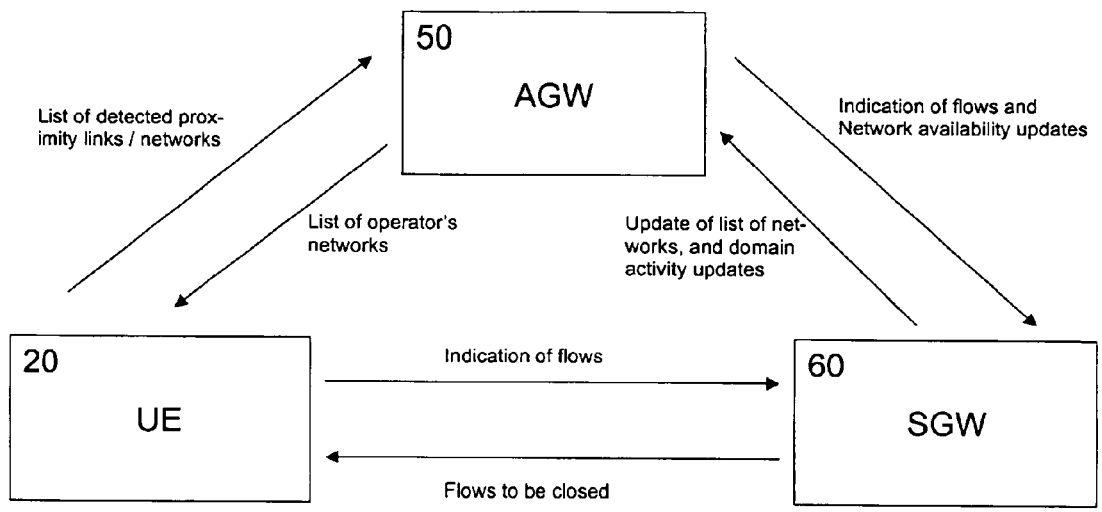
FIG. 4 shows a schematic signaling diagram of an example of a network-assisted modular policy resolution procedure according to the first embodiment.

FIG. 4 shows a schematic signaling diagram of an example of a network-assisted modular policy resolution procedure according to the first embodiment. The UE 20 provides to the AGW 50 a list of its detected proximity links/networks not visible to the operator infrastructure otherwise. The operator might even "pay" for such information by giving rebates. Vice versa, the AGW 50 provides to the UE 20 a list of that operator's networks, so that the UE 20 can select between several operators and proximity (ad-hoc) networks. The subscriber of the UE 20 may pay for the information.

Additionally, the UE 20 or the AGW 50 sends an indication of its flows to the SGW 60, unless implicitly detected by e.g. Session Initiation Protocol (SIP). The SGW 60 responds with an indication of flows to be closed due to access control decisions. The AGW 50 sends networks availability updates to the SGW 60, while the SGW 60 returns an update to AGW's list of networks and sends a domain activity updates to the AGW 50.

The exact distribution of functions depends on the UE capabilities and the level of support provided by the operators (e.g. do they allow the subscriber to use other networks). In case of asking for confirmations or selections from the end user instead of autonomous operation, there may be an interface between the NE and UE either via the SPR (default) or directly.

Regarding user configuration, any configuration events should be sent by the configuration application in one set (e.g. when all changes are committed by the user, or when the user closes the configuration application or user interface), because then they can be processed in the policy resolution at the same time. Alternatively, the policy resolution engine can buffer them over longer periods of time than the other trigger events but this is not as clean and efficient solution. If the user configuration events are sent when the user actually selects them, there will be many problems because user may soon afterwards cancel earlier configuration changes, or may first change some minor details and then in the end completely change e.g. profile that affects all policies.

In the following, a very high level implementation example for a Symbian connectivity management framework is described, wherein IAP represents the access network, BM represents a bearer manager that enforces the policy actions, and PolicyDB represents a repository of policy and state information.

Referring to the stages of FIG. 3, the purpose of the first stage is to initiate resolution process, starting with IAP availability detection, indication of an availability change can be based on a context information received from terminal internal sources, e.g. a timer or location detection (or other sensors), on a configuration information, e.g. a user interface (UI) access event (e.g. open ConfigApp or activate profile) or a UI configuration event, and/or on a network state information received from the BM, e.g. flow Initiation or flow termination.

In the following, a programming example of the first stage processing is given:

```
StartDetection( )
    BMDetectInterface(Interface)
BMDetectIAP(IAP)
```

The purpose of the second stage is to decide which IAPs are available and are not blocked by any of the current policies, i.e., which IAPs can be used. The procedure can be based on configuration information, e.g. Profile Preference changed or IAP Definition changed, and/or on network state information, e.g. IAP Available or IAP Unavailable.

In the following, a programming example of the second stage processing is given:

```
ChooseOkIAPs( )
    IAPList=DBReadIAPsActive( )+IAPsAvailable( )–
    IAPsUnavailable( )–
    ProfileDeny( )–IAPsDeny( )
    for all IAP in IAPList
        for all Pref
            if IAPAvailable(IAP) or PrefChanged(Pref)
                CompareOkPref(IAP,Prf,lvl)
            if not CombineOkPref(IAP)
                IAPList(IAP)=NOT_PREFERRED
    DBWriteIAPsOk(IAPList)
    if IAPList=0 Prompt(No IAPs, Pref override? Y/N)
```

The purpose of the third stage is to update flow-domain mappings, select IAP preference for each domain and start inactive but available IAPs if necessary. The procedure can be based on configuration information, e.g. Domain Preference changed or Domain Definition changed, and/or on network state information, e.g. flow initiation or flow termination.

In the following, a programming example of the third stage processing is given:

```
UpdateDomains( )
    FlowList=FlowsInitiated( )
    DomainList=DBReadDomainsActive( )
    for all Domain in DomainList
        if DomainDefinitionChanged(Domain)
            DomainFlowList=DomainFlows(Domain)+FlowList-
            FlowsTerminated( )
            for all Flow in DomainFlowList
                if not MatchFlowToDomain(Flow,Domain)
                    FlowList+=Flow
        if DomainPrefChanged(Domain)
            IAPsOk=DBReadIAPsOk( )
            if IAPsOk=0 Prompt(No IAPs, Pref override? Y/N)
            IAPList=SelectDomainIAPs(IAPsOk,Domain)
            DBWriteDomainIAPs(IAPList)
    for all Domain
        for all in FlowList
            if MatchFlowToDomain(Flow,Domain)
                RegisterFlowToDomain(Flow,Domain)
                FlowList-=Flow
            if DomainFlows(Domain)-FlowsTerminated( )=0
                DBDeleteDomainActive(Domain)
    for all Flow in FlowList
        BMStopFlow(Flow)
    for all Domain
        IAPList=DomainIAPsUp(Domain)-DBReadIAPsActive( )-
        DBReadIAPsPending( )
        for all IAP in IAPList
            BMStartIAP(IAP)
            DBAddIAPsPending(IAP)
```

The purpose of the fourth stage is to update LAP selection for each flow if necessary, decide about flow movement. The procedure can be based on network state information, e.g. IAP Unavailable or Flow Initiated.

In the following, a programming example of the fourth stage processing is given:

```
UpdateFlow( )
    FlowList=FlowsInitiated( )
    IAPList=IAPsUnavailable( )
    for all IAP in IAPList
        for all Flow in IAP
            if MIPOkWithFlow(Flow) and MIPOkWithIAP(IAP)
                FlowList+=Flow
            else
                BMStopFlow(Flow)
    for all Flow in FlowList
        IAP=DefaultDomainIAP(Flow)
        BMChangeFlow(Flow,IAP)
```

The purpose of the fifth stage is to deactivate unused IAPs. The procedure can be based on network state information, e.g. Flow Terminated or Flow Changed.

In the following, a programming example of the fifth stage processing is given:

```
StopIAP( )
    IAPList=CBReadIAPsActive( )
    for all IAP in IAPList
        if IAPFlows(IAP)=0
            BMStopIAP(IAP)
```

The second embodiment relates to a specific example of network-assisted policy resolution where components of the modular multi-access policy resolution framework defined in the first embodiment are shared in specific manner among the terminal device and its associated home and access networks.

Figure 5:
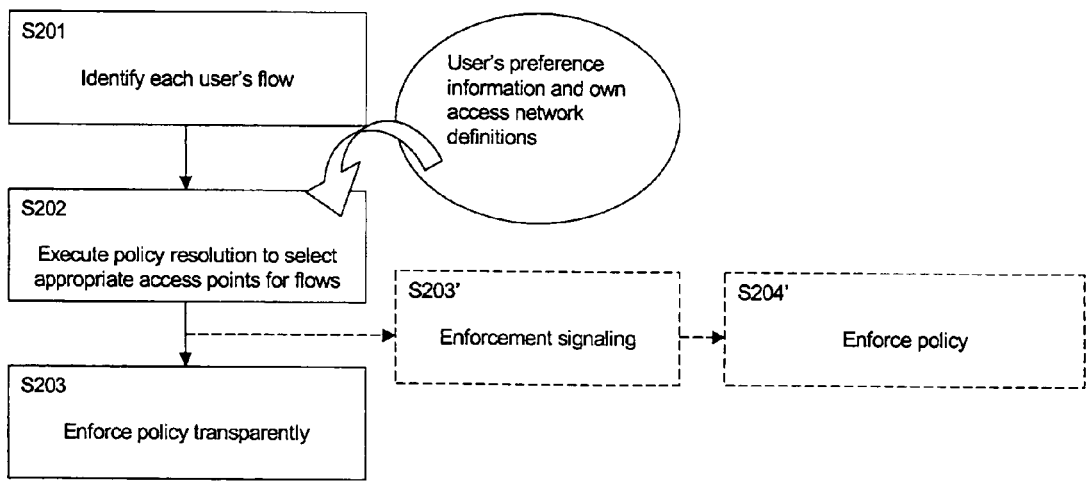
FIG. 5 shows a flow diagram of network-assisted policy resolution procedure according to a second embodiment.

FIG. 5 shows a flow diagram of the network-assisted policy resolution procedure according to the second embodiment, wherein the left-hand column of FIG. 5 indicates processing steps performed at the access network (AN), and the right-hand column indicates processing steps performed at the terminal device (UE). The processing block indicated middle portion of FIG. 5 relates to a processing which involves both access network and terminal device.

The access network (AN) maintains a relevant portion of the user's up-to-date preference information, and additionally it may have compatible definitions for all access points and network edge segments in the location. In step S201, the access network identifies each user's flows and is able to execute a proxy policy resolution process in step S202 in order to select an appropriate access point for the flow, using the user's preference information and its own access network definitions. The policies are enforced either transparently by the access network (as indicated in step S203), or by the terminal of the end user (alternative step S204') based on an enforcement signaling between the access network and the terminal device (alternative step S203').

Figure 6:
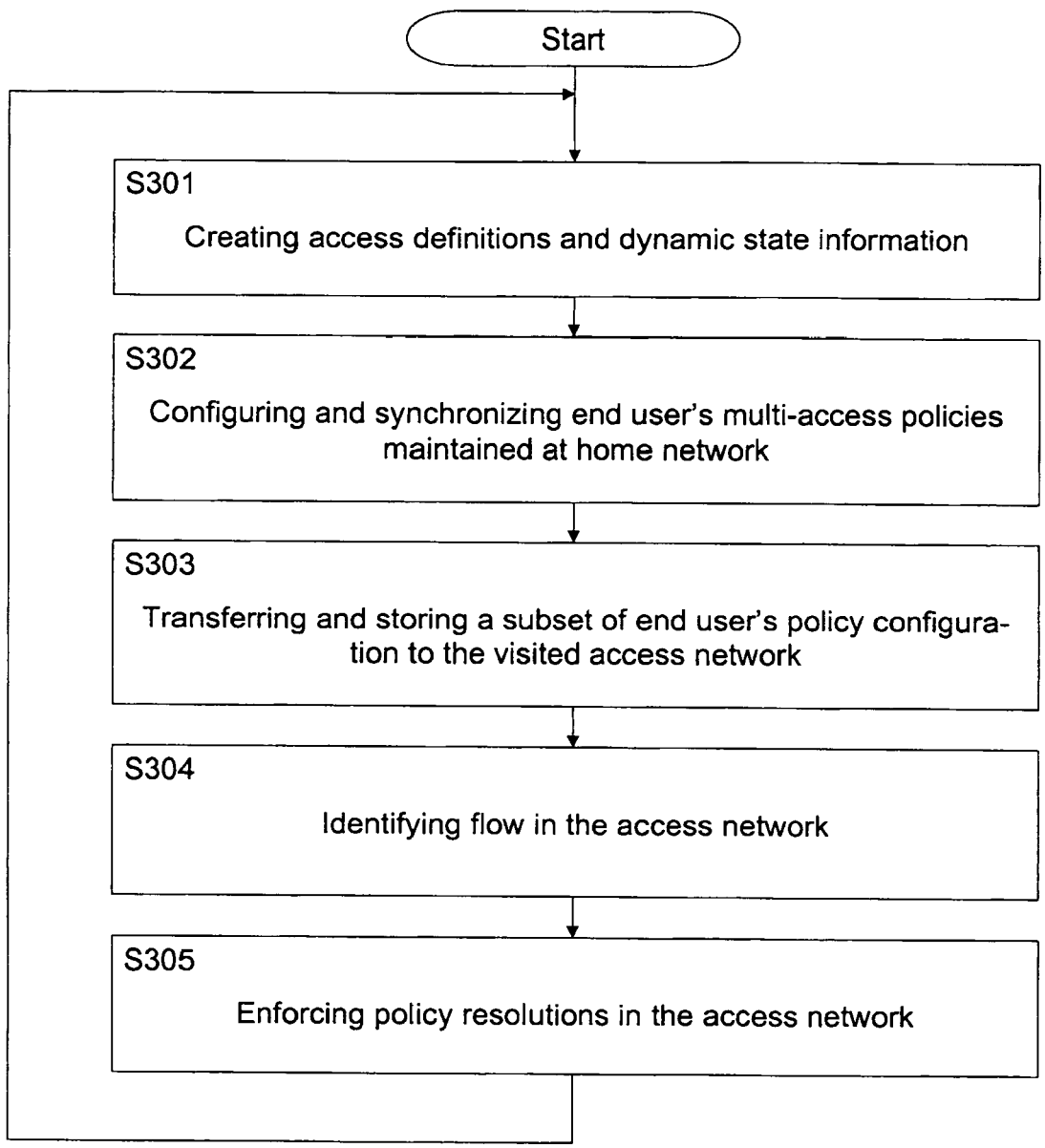
FIG. 6 shows a more detailed flow diagram of the network-assisted policy resolution procedure according to the second preferred embodiment.

FIG. 6 shows a more detailed flow diagram of the network-assisted policy resolution procedure according to the second preferred embodiment. Basically, the procedure comprises five steps S301 to S305.

In the first step S301, creation of access definitions in the access network for matching against the end user preferences combines static information based on knowledge of the access technologies and their parameters used in the access network edges (this can be done for example in the 3.9G Access Aggregation domain), and dynamic state information that indicates e.g. congestion and traffic QoS levels (this can be done in 3.9G Access Aggregation domain, or alternatively updates can be get from Access Connectivity domains).

In step S302, configuration and synchronization of end user's multi-access policies maintained in the home network (e.g. 3.9G Subscription domain) is performed. The terminal may have a secure connection, e.g. using IPsec (IP security) Encapsulating Security Payload (ESP) Security Association (SA) tunnel, to the network entity maintaining the policies. The user can also specify the conditions for transferring policies to remote networks for use in proxy resolution, e.g. send only policies related to a public end user identity, but not those related to a corporate end user identity of the same subscriber.

Then, in step S303, a subset of end user's policy configuration is transferred to the visited access network and is stored there while the user is accessing through the network. Only the currently active policy configuration needs to be transferred. This can be a continuation of the user authorization process that already involves both the access network and the home network.

In the subsequent step S304, a flow in the access network (e.g. 3.9G Access Aggregation domain) is identified. The end user is identified based on its IP address, which can be either bound to the physical network topology (e.g. in 3.9G Access Connectivity domains) or controlled by a mobility gateway (e.g. in 3.9G Access Aggregation domain). The remote end point of the flow can be identified in one of the following three ways (for policy enforcement, the IP address of at least the flow end point and potentially also the terminal usually need to be used):

The SIP proxy detects the URI of a session end point during the processing of an INVITE message from or to the terminal, and sends this to the PDP.

The DNS server detects the DNS name of the end point to which the terminal initiates a flow.

The border router or mobility gateway detect the IP address and/or port of the end point communicating with the terminal.

Finally, in step S305, policy resolutions are enforced in the access network (e.g. 3.9G Access Aggregation domain for some identity or mobility decisions, but usually Access Connectivity domains for access control and handover decisions—e.g. if context transfer is needed). The enforcement may also require the following actions in the terminal device:

The terminal device initiates a flow and waits until the access network sends the preferred access point identifier as response (authentication and authorization protocols could be reused for stateful control, or terminal could have a socket open for receiving any access network decisions).

The terminal device requests the preferred access point identifier to be provided by the access network (use same signaling mechanisms as above). This would allow the terminal to also provide flow specific additional requirements, e.g. support for Mobile IP or IPv6.

The terminal device initiates a flow, but the access network response is to delay the initiation until the terminal reaches a specific location that the access network knows to be in radio coverage, or until a congestion or error situation in the access network has passed.

According to the second embodiment, a Policy Decision Point (PDP) function is provided in the network, while a Policy Enforcement Point (PEP) function can be provided in the network or the terminal device (UE). Thus, advantage is taken of the following properties of the first embodiment: The end user driven model for policy configuration leads to simple and compact policies, which makes it easier to both maintain network based end user policies from the terminal, and efficiently send them for proxy resolution in remote networks (in contrast to very detailed policies defined using a specific and explicit syntax). The abstraction of policy objects ("profile", "domain", "access") makes the policy resolution algorithms independent of not only the terminal platform, but also the access network platform. Furthermore, the abstraction of policy attributes ("price", "power consumption", etc.) allows the access network to have some flexibility in its access point definitions and local policy resolution algorithms, making it possible to support many types of access technologies (Access Connectivity domains) with the same algorithms. Additionally, the separation of user related policy information (profiles and domains) from access network related policy information (accesses and access point groups) allows the overall policy configuration to be derived from two sources, namely each individual end user and the access network. Finally, the use of a data flow as the basic policy object for which policies are resolved and decisions made allows a similar identification of the policy objects and their relationships in both the terminal and the access network.

Figure 7:
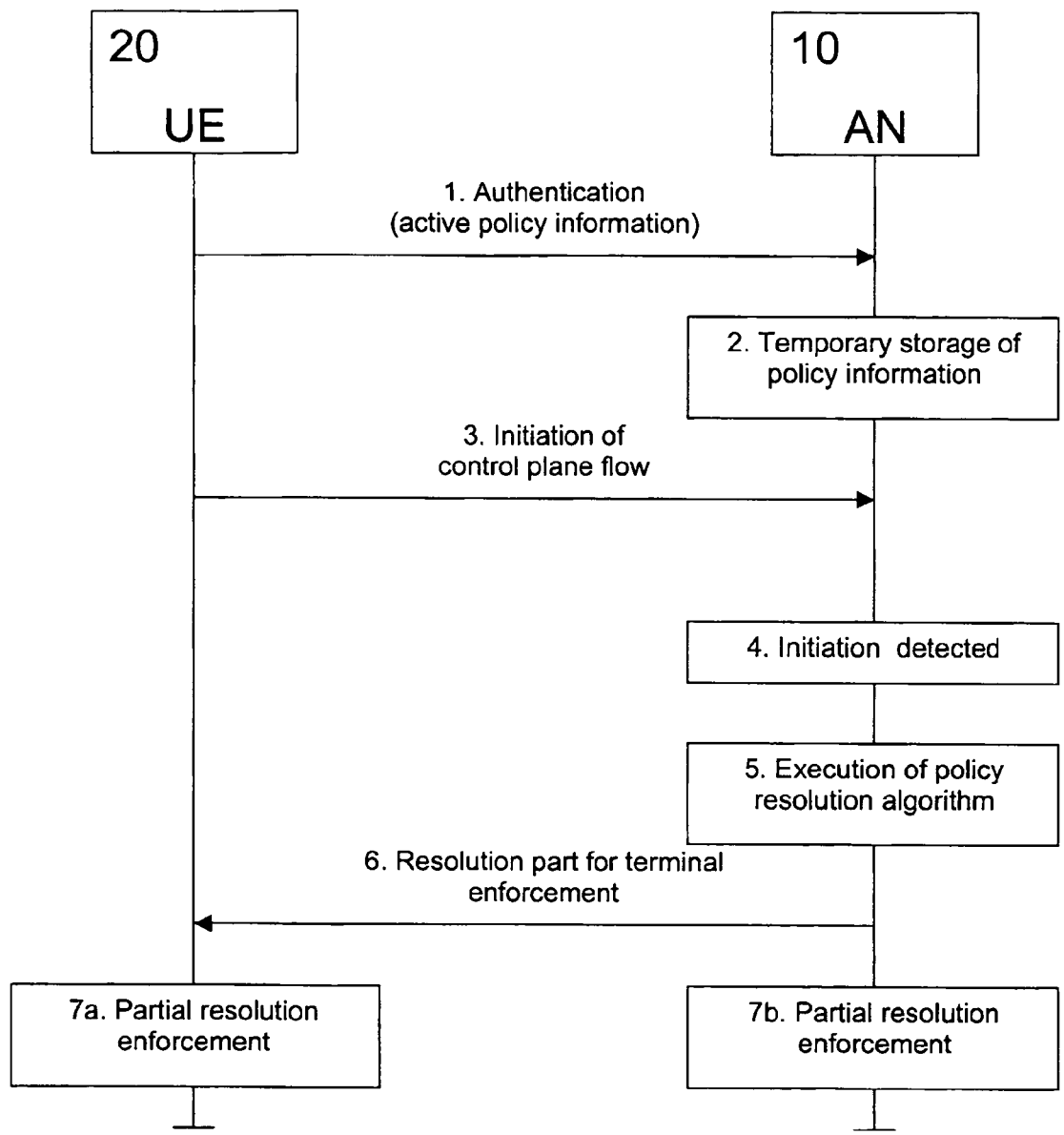
FIG. 7 shows a schematic signaling and processing diagram of the network-assisted policy resolution procedure according to the second embodiment.

FIG. 7 shows a schematic signaling and processing diagram of an example of the network-assisted policy resolution procedure between a terminal device (UE 20) and an access network (AN 10) according to the second embodiment.

It is assumed that the visited AN 10 has capability definitions for all access points operated by contracted providers in its geographical area.

In step 1, the UE 20 authenticates with the visited access network. The AN 10 receives the terminal user's currently active policy information and stores it temporarily in step 2. Then, in step 3, the UE 20 makes a control plane initiation of a flow over a default interface. This initiation is detected in step 4 by the AN 10 using methods described above. Then, in step 5, the AN 10 executes the policy resolution algorithm and gets a result. In step 6, the AN 10 sends a part of the result that requires terminal enforcement to the UE 20. Finally, in step 7a, the UE 20 enforces the received part of the result, and thus performs a partial resolution enforcement. In parallel, the AN 10 enforces the rest of the result itself, and thus also performs a partial resolution enforcement.

In summary, a policy resolution method and system, access network and terminal device have been described for enabling modular network-assisted policy resolution, wherein the policy resolution is divided into separate stages each handling specific types of trigger events and performing specific types of policy actions. The separate stages are processed in a chronological order during a policy resolution round, and trigger events which occur during a policy resolution round are frozen until the start of the next policy resolution round. Thereby, modular policy resolution with reduced delays and oscillations can be achieved. Moreover, policy processing can be divided into a policy decision point functions in the network and a policy enforcement point function in the network or terminal device, so that terminal resources used for policy resolution can be saved.

Figure 8:
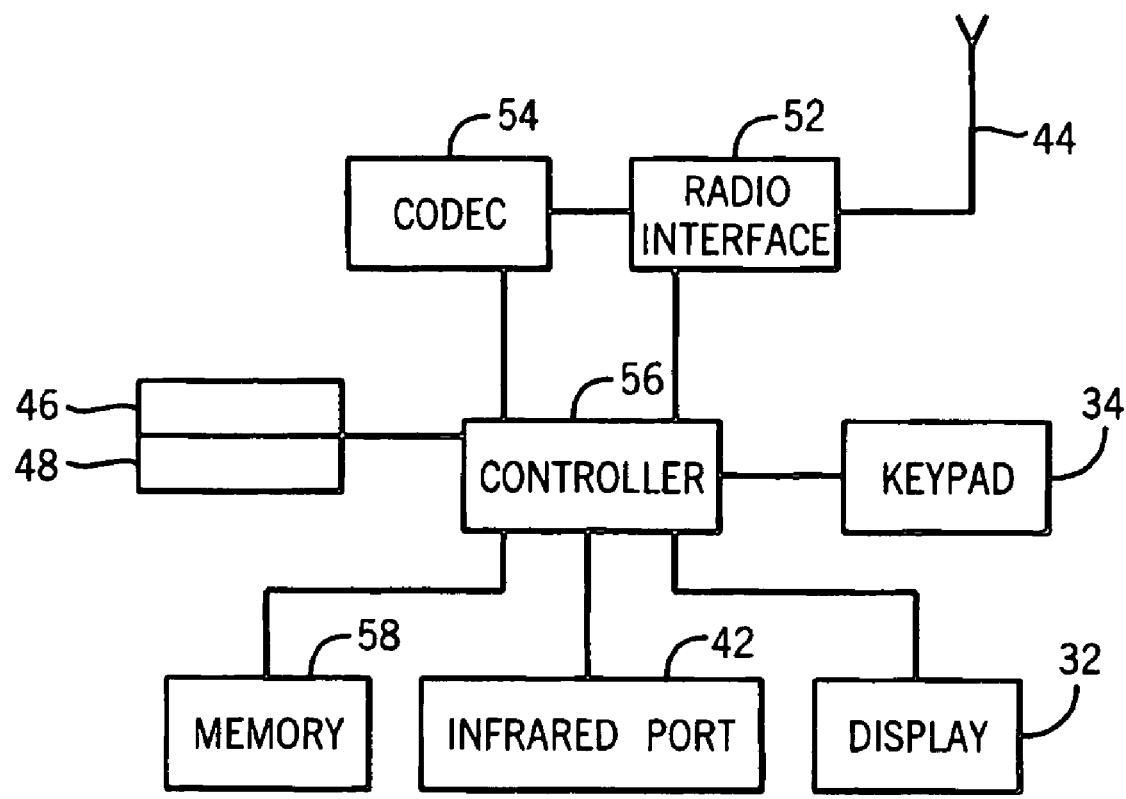
FIG. 8 is a schematic representation of the circuitry of an electronic device that may be used in the implementation of the present invention.

FIG. 8 show the circuitry of a representative electronic device which may be used in of the devices discussed herein for the implementation of the present invention. However, it is important to note that the present invention is not limited to any specific type of electronic device, and each electronic device used in the implementation of the present invention may not include all of the individual components discussed herein. The electronic device of FIG. 8 includes a display 132, a keypad 134, a battery 140, an infrared port 142, an antenna 144, a smart card 146 in the form of a universal integrated circuit card (UICC) according to one embodiment, a card reader 148, radio interface circuitry 152, codec circuitry 154, a controller or processor 16 and a memory unit 14. Individual circuits and elements are all of a type well known in the art.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

It is noted that the present invention is not restricted to the above preferred embodiments with multi-access policies but can be applied in connection with any type of policy resolution, where cell-portion specific remote heads are used for obtaining better coverage. The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. The preferred embodiments may thus vary within the scope of the attached claims.

What is claimed is:

1. A method of policy resolution with interdependent trigger events and policy actions, comprising:
dividing a policy resolution into separate stages each handling specific types of trigger events and performing specific types of policy actions;
processing in a terminal device, at least one of the separate stages in a chronological order during a policy resolution round; and
freezing trigger events which occur during a policy resolution round until the start of the next policy resolution round, wherein an access is selected from a plurality of accesses available to the terminal device.

2. A method according to claim 1, wherein the policy resolution round comprises a first stage of network availability detection, a second stage of listing of accessible networks, a third stage of updating of associations between traffic flows and their parent domains and selection and joining of preferred networks for domains, a fourth stage of updating of associations between flows and access networks and deciding on handovers, a fifth stage of disconnection from networks or deactivation of interfaces, and a sixth stage of execution of policy resolution.

3. A method according to claim 1, wherein the trigger events comprise configuration events and connectivity events.

4. A method according to claim 3, further comprising sending the configuration events by a configuration application in one set.

5. A method according to claim 3, further comprising buffering the configuration events over time periods longer than those of other trigger events.

6. A method according to claim 2, wherein the first stage is performed based on knowledge about the need for the first or estimation about when the first stage could result in new information.

7. A method according to claim 2, wherein the second stage is started from a list of networks that were detected as available, and wherein those networks which are blocked by current policies are removed from the list.

8. A method according to claim 2, wherein the third stage is performed by checking flows of a first domain with respect to the need to move to a second domain.

9. A method according to claim 2, wherein the disconnection and deactivation in the fifth stage is performed for any access network that no longer has any active flows.

10. A method according to claim 2, wherein the first stage is performed based on context information indicating at least one of a timer event and a location detection, configuration information indicating at least one of a user interface access event and a user interface configuration event, and network state information indicating at least one of a flow initiation and a flow termination.

11. A method according to claim 2, wherein the second stage is performed based on configuration information indicating at least one of a change of profile preference and an access point change, and network state information indicating at least one of an available access point and a unavailable access point.

12. A method according to claim 2, wherein the third stage is performed based on configuration information indicating at least one of a change of domain preference and an change of domain definition, and network state information indicating at least one of a flow initiation and a flow termination.

13. A method according to claim 2, wherein the fourth stage is performed based on network state information indicating at least one of an unavailable access point and an initiated flow.

14. A method according to claim 2, wherein the fifth stage is performed based on network state information indicating at least one of a flow initiation and a flow termination.

15. A method according to claim 2, wherein the processing of the first and fifth stages is performed at the terminal device of a respective user.

16. A method according to claim 2, wherein processing of each of the first, third and fourth stages and at least a partial processing of the second stage is performed at a gateway device, wherein the gateway device comprises an access gateway device.

17. A method according to claim 2, wherein at least a partial processing of the second stage is performed at a service gateway device.

18. A policy resolution system including computer-executable instructions embodied on a non-transitory computer-readable medium for execution by a processor for performing policy resolution with interdependent trigger events and policy actions, comprising:
a resolution and enforcement mechanism configured to:
process separate stages of policy resolution in a chronological order during a policy resolution round, each of the stages handling specific types of trigger events and performing specific types of policy actions, and
freeze trigger events which occur during a policy resolution round until the start of the next policy resolution round, wherein an access is selected from a plurality of accesses available to a terminal device.

19. An access network apparatus for performing policy resolution with interdependent trigger events and policy actions, the access network comprising:
a processor; and
a memory unit operatively connected to the processor and including computer-executable instructions configured to perform a process of policy resolution with interdependent trigger events and policy actions, comprising:
dividing a policy resolution into separate stages each handling specific types of trigger events and performing specific types of policy actions;
processing in a terminal device, at least one of the separate stages in a chronological order during a policy resolution round; and
freezing trigger events which occur during a policy resolution round until the start of the next policy resolution round, wherein an access is selected from a plurality of accesses available to the terminal device.

20. An access network apparatus according to claim 19, wherein the access network apparatus is configured to enforce policies transparently.

21. An access network apparatus according to claim 20, wherein the access network apparatus is configured to have policies at least partially enforced at the terminal device by initiating an enforcement signaling with the terminal device.

22. An access network apparatus according to claim 19, wherein the access network apparatus is configured to create access definitions for matching against preference information of users maintained by the access network apparatus.

23. An access network apparatus according to claim 19, wherein the computer-executable instructions are further configured to identify user flows including identifying an end user based on the end user's Internet Protocol address.

24. An access network apparatus according to claim 19, wherein the computer-executable instructions are further configured to identify user flows including code identifying a remote end point based on one of a Uniform Resource Identifier (URI) detected by a Session Initiation Protocol (SIP) proxy, a Domain Name Server (DNS) name detected by a DNS server, and at least one of an Internet Protocol (IP) address and port detected by a border router and a mobility gateway.

\* \* \* \* \*